United States Patent [19]

Harvey

[11] Patent Number: 4,515,457
[45] Date of Patent: May 7, 1985

[54] EXPOSURE CONTROL MECHANISM

[75] Inventor: Donald M. Harvey, Webster, N.Y.

[73] Assignee: Eastman Kodak Company, Rochester, N.Y.

[21] Appl. No.: 611,578

[22] Filed: May 18, 1984

[51] Int. Cl.³ .................... G03B 7/097; G03B 9/00
[52] U.S. Cl. ........................... 354/443; 354/228; 354/267.1
[58] Field of Search ............... 354/441–445, 354/228, 229, 231, 234.1, 235.1, 266, 267.1

[56] References Cited

U.S. PATENT DOCUMENTS

| | | | |
|---|---|---|---|
| 3,068,770 | 12/1962 | Bing | 95/10 |
| 3,385,187 | 5/1968 | Bestenreiner | 95/10 |
| 3,718,079 | 2/1973 | Fuller | 95/62 |
| 3,916,425 | 10/1975 | Tanaka | 354/196 |
| 4,059,836 | 11/1977 | Hochreiter et al. | 354/29 |
| 4,324,463 | 4/1982 | Lermann et al. | 354/228 X |

Primary Examiner—William B. Perkey
Attorney, Agent, or Firm—Roger A. Fields

[57] ABSTRACT

In a camera of the type having (a) an adjustable diaphragm for reducing the effective size of an exposure aperture and (b) a shutter including an opening blade for uncovering the exposure aperture and a closing blade for re-covering the exposure aperture, a single electromagnet is used in conjunction with an ambient light-regulated circuit to control the diaphragm and the shutter in relation to the intensity of ambient light. The electromagnet is energized only once for each film exposure, at alternative times corresponding to relatively dim and relatively bright ambient light. During dim light, the electromagnet is energized before the diaphragm can reduce the effective size of the exposure aperture, to retain the diaphragm with the closing blade removed from the exposure aperture during shutter opening. During bright light, the electromagnet is energized after the diaphragm reduces the effective size of the exposure aperture, to retain only the closing blade during shutter opening at the smaller size aperture. De-energization of the electromagnet releases the closing blade (and the diaphragm, if it is retained) to permit shutter closing.

Such use of the electromagnet, only once for each film exposure, requires less current drain on a camera battery as compared to prior art devices, and therefore is a more efficient use of the electromagnet.

8 Claims, 9 Drawing Figures

EXPOSURE CONTROL MECHANISM

BACKGROUND OF THE INVENTION

1. Field of the Invention

The invention relates generally to exposure control apparatus for use in a camera, and more particularly to the use of a single electromagnetic device in an ambient light-regulated circuit to control a diaphragm and a shutter in accordance with the intensity of ambient light.

2. Description of the Prior Art

Exposure control apparatus in cameras often include a light-responsive electromagnetic circuit for controlling operation of a diaphragm and a shutter in relation to the intensity of ambient light. Typically, for example in U.S. Pat. No. 3,812,498, the circuit uses two electromagnets. One electromagnet controls adjustment of the diaphragm to reduce the effective size of an exposure aperture, and the other electromagnet controls closure of the shutter to terminate the exposure interval after the shutter has been opened. A light level measuring subcircuit comprising a photosensor and a series-connected resistor is often used for controlling the one electromagnet to adjust the diaphragm, and a light dependent R-C (resistor-capacitor) subcircuit comprising a photosensor and a series-connected capacitor is often used to control the other electromagnet to close the shutter.

It has also been proposed, for example in U.S. Pat. No. 3,385,187, to use a single electromagnet in conjunction with the light-responsive circuit to control both the diaphragm and the shutter. The single electromagnet is coupled with the light level measuring subcircuit and is initially energized to retain a locking pawl during the time a diaphragm, in the form of a Waterhouse stop, operates to vary the size of the exposure aperture. The electromagnet becomes de-energized to release the pawl to lock the diaphragm at a selected aperture size related to the intensity of ambient light. The action of locking the diaphragm also locks a shutter blade to prevent the blade from moving to re-cover the exposure aperture. The electromagnet is then coupled with the light dependent R-C subcircuit. At the end of an exposure interval as established by the R-C subcircuit, the electromagnet is re-energized and re-attracts the locking pawl to release the shutter blade, which then moves to re-cover the exposure aperture. Thus, the electromagnet becomes de-energized to set the diaphragm and subsequently is re-energized to initiate shutter closing. When the electromagnet is energized or re-energized to remove the locking pawl from its locking position, the magnetic force must act against the spring force holding the pawl in its locking position and must act against the mass of the locking pawl. The magnetic force needed for such operation is relatively high and requires a camera battery of corresponding high current capacity to reliably operate the electromagnet to attract the locking pawl. To reduce such high magnetic force and its attendant current drain on a camera battery, light spring forces are employed to hold the locking pawl in its locking position. However, light spring forces do not reliably lock the diaphragm or the shutter, and therefore the use of a single electromagnet in this manner to control both the diaphragm and the shutter does not provide effective use of the electromagnet.

An improved manner of using a single electromagnet to control both a diaphragm and a shutter is proposed in commonly assigned U.S. Pat. No. 4,059,836. In this instance, an armature couples the diaphragm, in the form of an aperture blade, and a closing blade of the shutter with the electromagnet. When a release member is initially depressed, the electromagnet is energized to hold the armature in the respective paths of movement of the aperture and closing blades. This prevents the aperture blade from moving to reduce the effective size of the exposure aperture after the aperture blade is freed by continued depression of the release member. Also, it prevents the closing blade from moving to re-cover the exposure aperture after the closing blade is freed by subsequent actuation of an opening blade to uncover the exposure aperture. If ambient light is relatively bright, e.g., above 200 footlamberts, the electromagnet is temporarily de-energized, which permits the aperture blade to move to reduce the effective size of the exposure aperture. Then, the electromagnet is re-energized, before the opening blade is actuated, to hold the closing blade removed from the exposure aperture. If ambient light is relatively dim, e.g., below 200 footlamberts, the electromagnet remains energized, i.e., is not temporarily de-energized, to hold the aperture and closing blades removed from the exposure aperture. After the opening blade has uncovered the exposure aperture for a duration related to the intensity of ambient light, the electromagnet is de-energized to permit the closing blade to re-cover the exposure aperture.

The use of a single electromagnet to control both a diaphragm and a shutter as proposed in U.S. Pat. Nos. 4,059,836 and 3,385,187, requires that the electromagnet be energized twice for each film exposure during relatively bright ambient light in the '836 patent and during any type of lighting condition in the '187 patent. Such multiple energization of the electromagnet for each film exposure (as compared to only one energization) is undesirable because of the attendant current drain on a camera battery, and therefore does not provide efficient use of a single electromagnet to control both the diaphragm and the shutter.

SUMMARY OF THE INVENTION

The above-described problems regarding the use of a single electromagnet to control both a diaphragm and a shutter in a camera are believed solved by the invention.

Specifically, the invention is embodied in a camera of the type provided with (a) a diaphragm for reducing the effective size of an exposure aperture, (b) a shutter including an opening blade for uncovering the exposure aperture and a closing blade for re-covering the exposure aperture, and (c) means, such as respective springs, for urging the diaphragm to reduce the effective size of the exposure aperture and for urging the opening and closing blades to uncover and re-cover the exposure aperture, and is the improvement comprising:

electromechanical means, including a single electromagnet, activatable alternatively (i) at one time before the diaphragm reduces the effective size of the exposure aperture, for retaining the diaphragm and the closing blade (removed from the exposure aperture) to prevent the diaphragm from reducing the effective size of the exposure aperture and to prevent the closing blade from re-covering the exposure aperture, or (ii) at another time after the diaphragm reduces the effective size of the exposure aperture, for retaining only the closing blade, and de-activatable to release the diaphragm and the closing blade, or merely the closing blade, to permit the closing blade to re-cover the exposure aperture; and ambient light-regulated circuit means for activating the electromechanical means before the opening blade uncovers the exposure aperture (i) at said one time during relatively dim ambient light or (ii) at said other time during relatively bright ambient light, and for de-activating the electromechanical means after the opening blade uncovers the exposure aperture for a duration related to the intensity of ambient light.

Thus, the invention represents an improvement over the prior art exposure control apparatus described above, in that the single electromagnet for controlling both the diaphragm and the shutter need only be energized once for each film exposure. According to the invention, the electromagnet is energized once at alternative times corresponding to relatively dim and relatively bright ambient light, to retain the diaphragm with the closing blade removed from the exposure aperture during shutter opening, or to retain only the closing blade during shutter opening, and is de-energized to permit shutter closing. Such use of the electromagnet requires less current drain on the camera battery as compared to the described prior art devices, and therefore is a more efficient use of the electromagnet.

BRIEF DESCRIPTION OF THE DRAWINGS

The invention will be described in connection with the drawings, wherein.

DESCRIPTION OF THE PREFERRED EMBODIMENT

The invention is described as being embodied in a still picture camera. Because such photographic cameras are well known, this description is directed in particular to camera elements forming part of or cooperating directly with the preferred embodiment. It is to be understood, however, that camera elements not specifically shown or described may take various forms known to persons of ordinary skill in the camera art.

Figure 1:
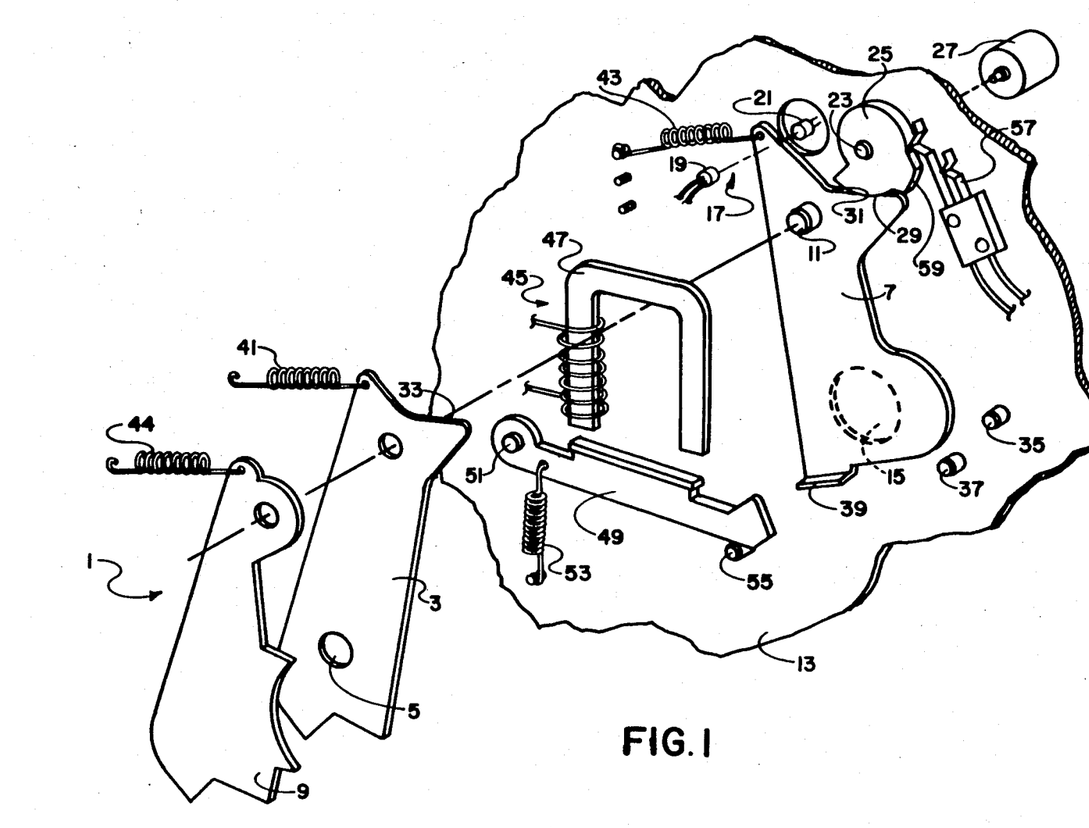
FIG. 1 is an exploded perspective view of an exposure control mechanism according to a preferred embodiment of the invention.
Figure 2:
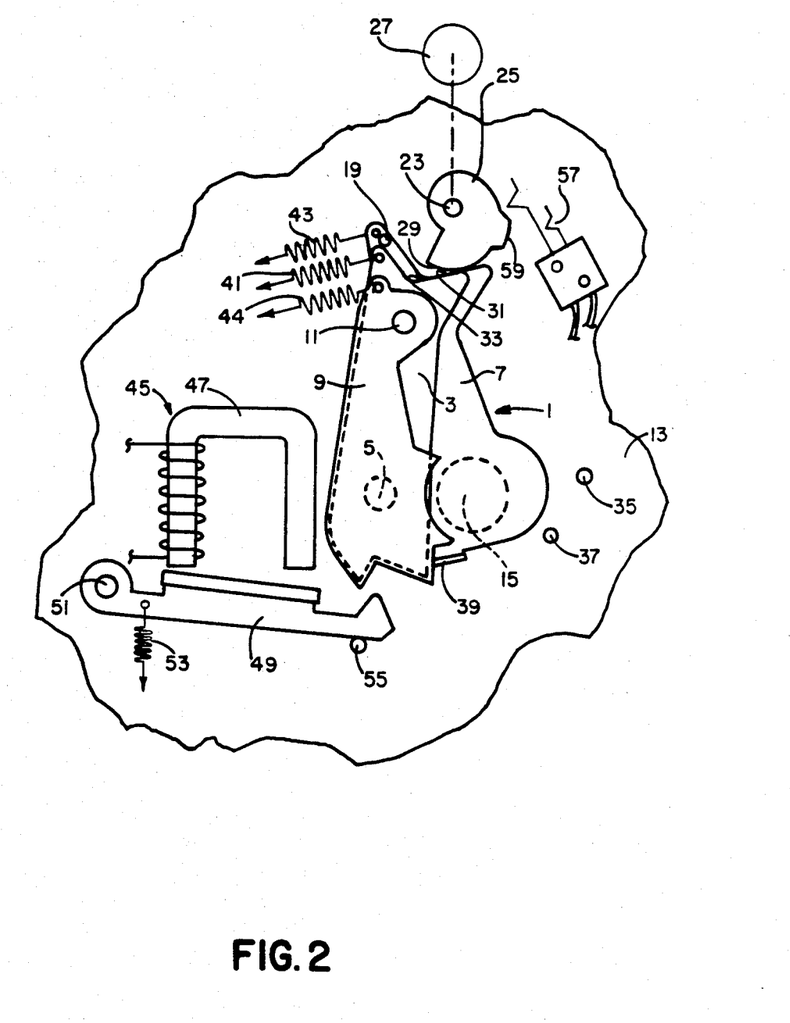
FIGS. 2, 3, 4, 5, 6, 7, and 8 are front elevation views of the exposure control mechanism depicted in FIG. 1, showing the sequence of operation of such mechanism.
Figure 3:
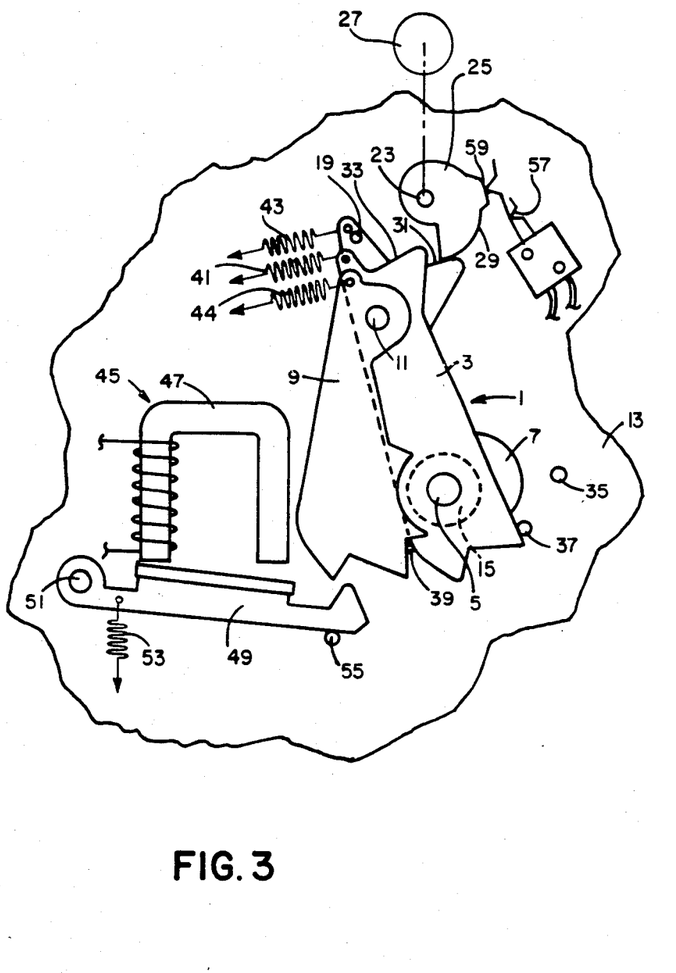
Figure 5:
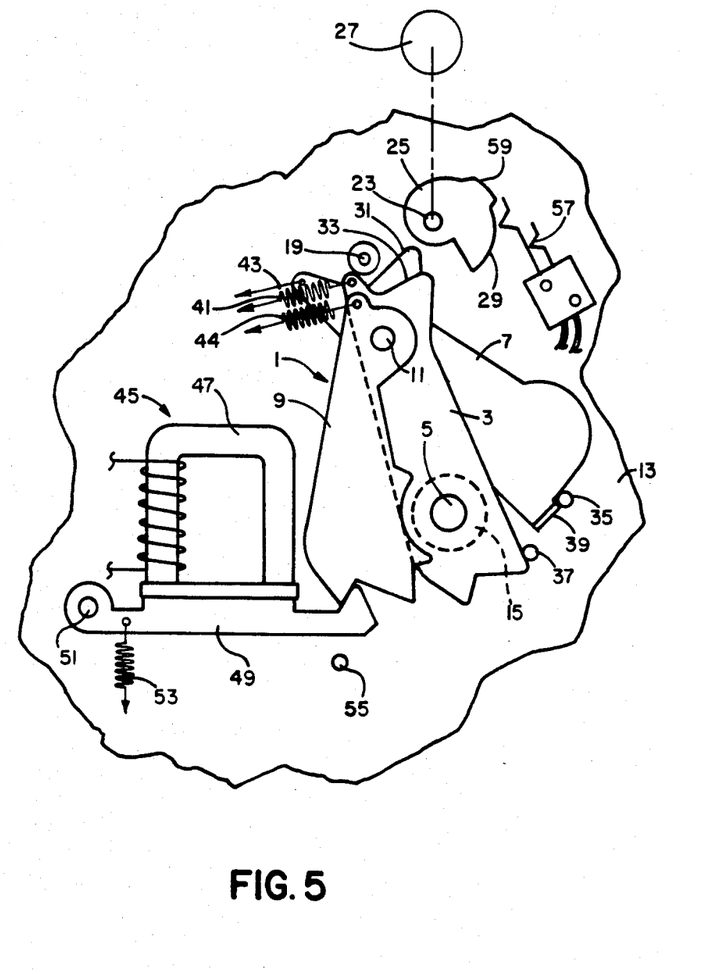
Figure 6:
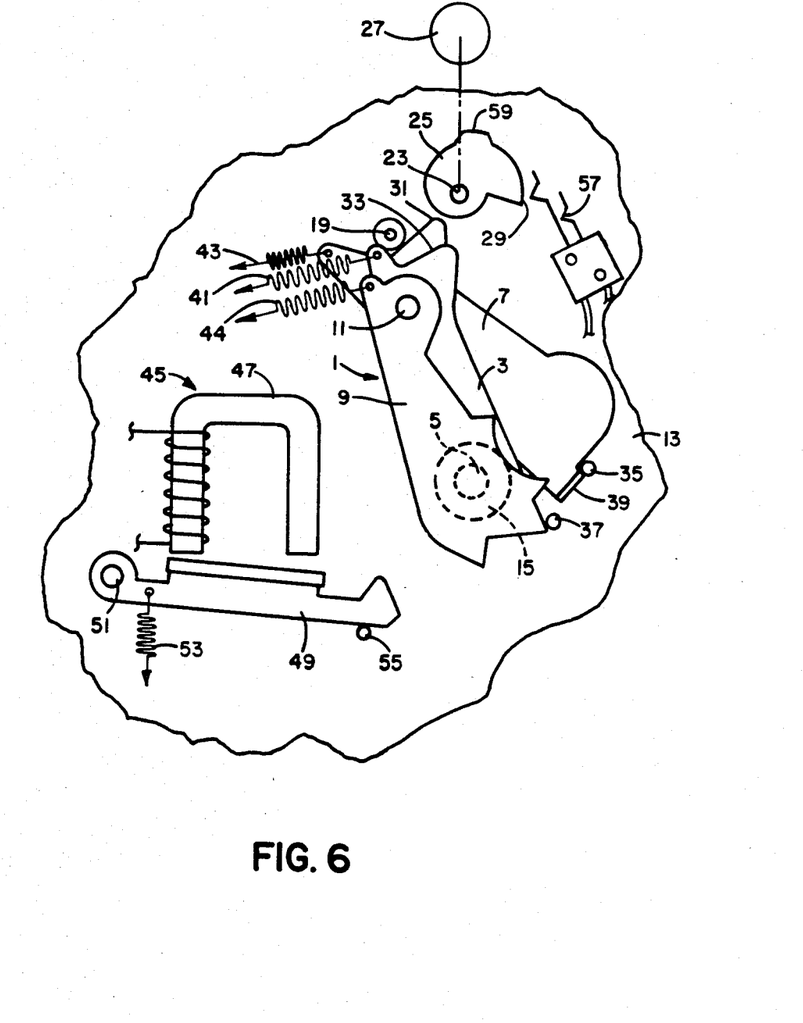
Figure 8:
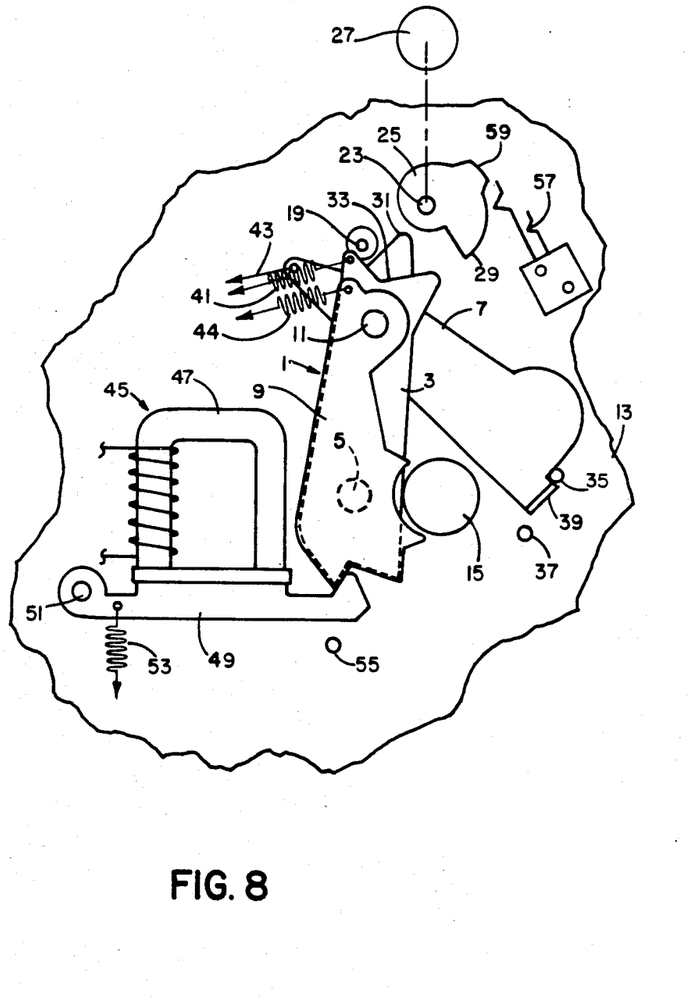

Referring now to the drawings, there is shown an exposure control mechanism according to the preferred embodiment of the invention. The mechanism, as shown in FIG. 1, includes a diaphragm and shutter assembly 1 comprising a diaphragm, in the form of an opaque aperture blade 3 having a single hole 5, and a shutter, in the form of an opaque opening blade 7 and an opaque closing blade 9. A stud 11 on a base plate 13 supports the three blades 3, 7, and 9 for pivotal movement independently about a common axis. The aperture blade 3 is pivotable between an idle position in which it is removed from an exposure aperture 15 in the base plate 13, as shown in FIG. 2, and a stopping down position in which the hole 5 in such blade coincides with the exposure aperture to reduce the effective size of the aperture, as shown in FIG. 3. In the preferred embodiment, the size of the exposure aperture 15 might represent f/5.6 and the size of the smaller hole 5 might represent f/11. The opening blade 7 is pivotable between a covering position in which it blocks the exposure aperture 15, as shown in FIG. 2, and an uncovering position in which it is removed from the exposure aperture to initiate an exposure interval, as shown in FIGS. 5 and 8. The closing blade 9 is pivotable between a non-covering position in which it is removed from the exposure aperture 15, as shown in FIG. 2, and a re-covering position in which it blocks the exposure aperture to terminate the exposure interval, as shown in FIG. 6, following movement of the opening blade 7 to its uncovering position. In the preferred embodiment, the exposure interval is for respective pre-set durations, e.g., 1/200 sec. or 1/80 sec., associated with the two f-stops, f/11 and f/5.6. However, the exposure interval may be for various durations determined by a conventional light-integrating timing circuit in accordance with the intensity of ambient light. An optical switch 17 for shutter timing comprises a light emitting diode (LED) 19 and a phototransistor 21, which are separated by the opening blade 7 in its covering position to maintain the switch opened, as shown in FIGS. 1 and 2. The optical switch 17 is closed whenever the opening blade 7 is pivoted from between the LED 19 and the phototransistor 21 to its uncovering position, as shown in FIGS. 5 and 8. The start of shutter timing may thus be synchronized with uncovering of the exposure aperture 15 by the opening blade 7, to enable the closing blade 9 to re-cover the exposure aperture after the appropriate pre-set duration.

A stud 23 on the base plate 13 supports a cocking-releasing cam 25 for uni-directional rotation by a drive motor 27. During a typical sequence of operation, beginning with FIG. 6, the cam 25 is rotated in a counterclockwise direction about the stud 23 to move an arcuate edge 29 of the cam 25 successively against respective follower edges 31 and 33 of the opening and aperture blades 7 and 3. This is done initially to pivot the opening and aperture blades 7 and 3 in a clockwise direction about the stud 11 from their uncovering and stopping down positions against respective stop pins 35 and 37 on the base plate 13 to their covering and idle positions, shown in FIG. 2, and then to momentarily retain the opening and aperture blades in their covering and idle positions. A tab 39 is located on the opening blade 7 to initially pivot the closing blade 9 in overlapping relation with the the aperture blade 7 from its re-covering position, shown in FIG. 6, to its non-covering position, shown in FIG. 2, as the opening blade is pivoted from its uncovering position to its covering position, and to then momentarily retain the closing blade in its non-covering position. When the aperture, opening, and closing blades 3, 7 and 9 are in their idle, covering, and non-covering positions, continued rotation of the cam 25 in the counterclockwise direction about the stud 23 first moves the arcuate edge 29 of the cam clear of the follower edge 33 of the aperture blade 3, as shown in FIG. 3, and then moves the arcuate edge clear of the follower edge 31 of the opening blade 7, as shown in FIGS. 5 and 8, to successively release the aperture and opening blades for possible return by respective springs 41 and 43 to their stopping down and uncovering positions against the two stop pins 35 and 37. By the same token, the closing blade 9 may be returned by a spring 44 to its re-covering position against the tab 39 on the opening blade 7.

Figure 4:
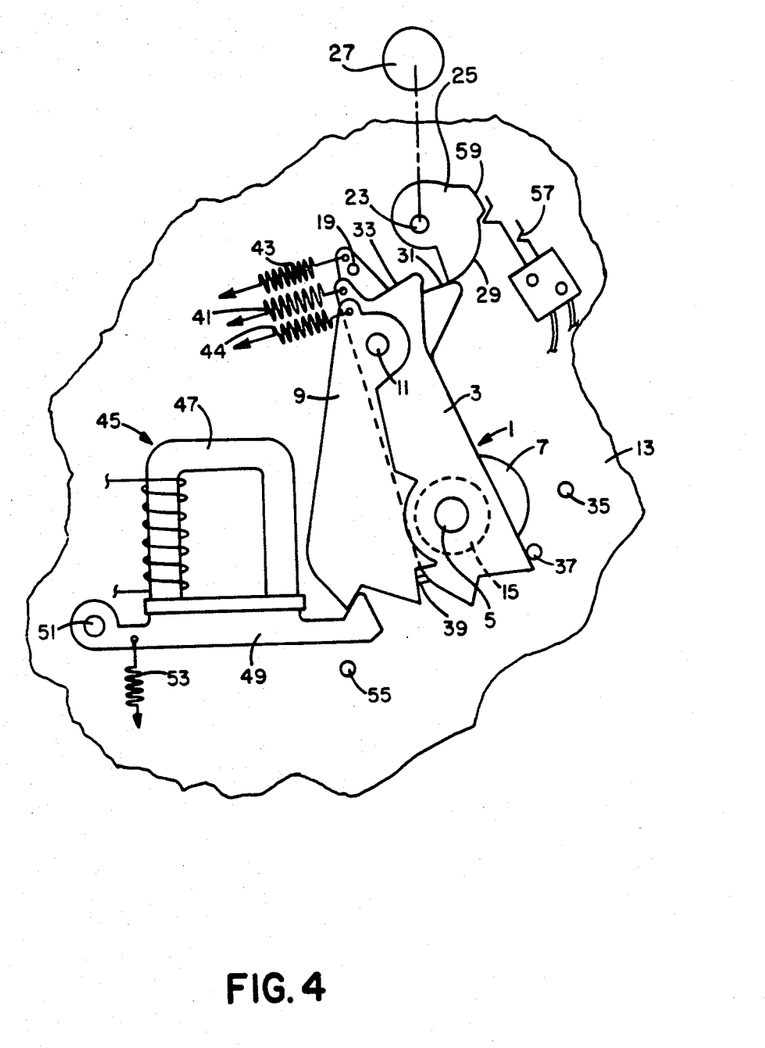
Figure 7:
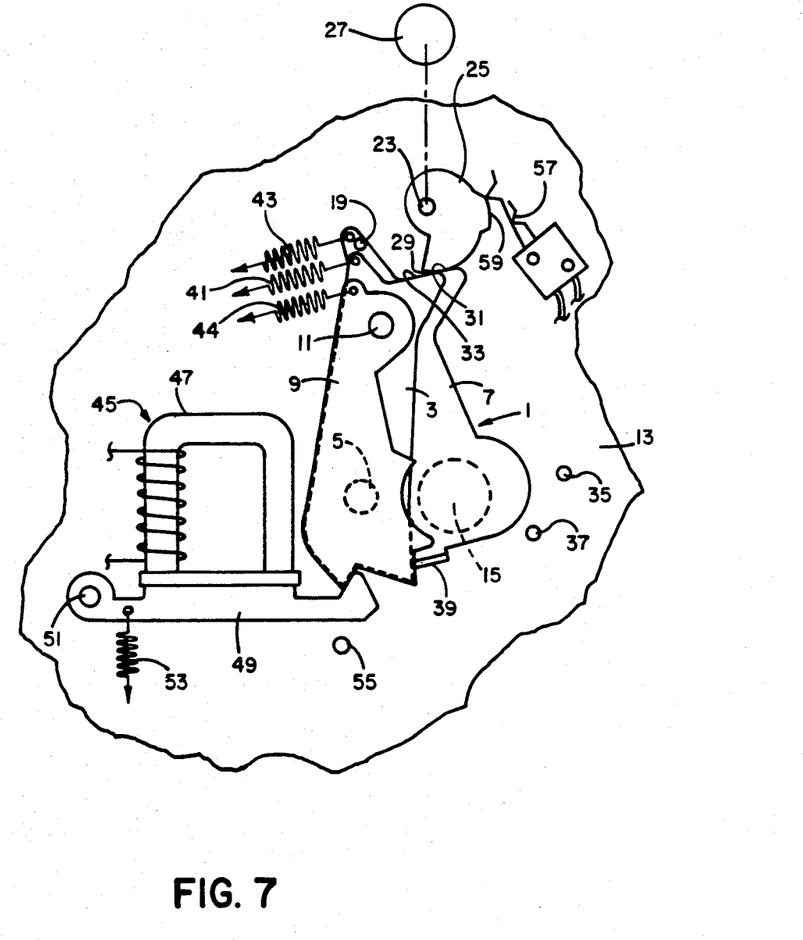

An electromagnetic device 45 comprises an electromagnet 47 and an armature 49. The electromagnet 47 is a known type having a core of magnetic material surrounded by a coil of wire through which an electric current is passed to magnetize the core and thereby energize the electromagnet. Discontinuing such current to the wire coil de-energizes the electromagnet. The armature 49 is supported by a stud 51 on the base plate 13 for pivotal movement in a counterclockwise direction about the stud, in response to energization of the electromagnet 47, to engage the aperture and closing blades 3 and 9 in their idle and non-covering positions, as shown in FIG. 7, or to engage only the closing blade in its non-covering position, as shown in FIG. 4. A spring 53 urges the armature 49 to pivot in a clockwise direction about the stud 51 against a stop pin 55 on the base plate 13, in response to de-energization of the electromagnet 47, to release the aperture and closing blades 3 and 9 or merely the closing blade. The electromagnet 47 is energized alternatively at one time during relatively dim ambient light, e.g., 50 footlamberts for ASA 200 film, before the cocking-releasing cam 25 releases the aperture and opening blades 3 and 7 from their idle and covering positions, as shown in FIG. 7, or at another time during relatively bright ambient light, e.g., 500 footlamberts for ASA 200 film, after the cam releases the aperture blade, but before the cam releases the opening blade, as shown in FIG. 4. Thus, during relatively dim ambient light the armature 49 will retain the aperture and closing blades 3 and 9 in their idle and non-covering positions, as shown in FIG. 7, and during relatively bright ambient light the armature will retain only the closing blade, as shown in FIG. 4. The electromagnet 47 is de-energized to permit the armature 49 to release the aperture and closing blades 3 and 9 or merely the closing blade after the cam 25 releases the opening blade 7, as shown in FIGS. 8 and 5, and the opening blade uncovers the exposure aperture 15 for the pre-set short duration, e.g., 1/200 sec., during bright ambient light or the pre-set long duration, e.g., 1/80 sec., during dim ambient light.

Figure 9:
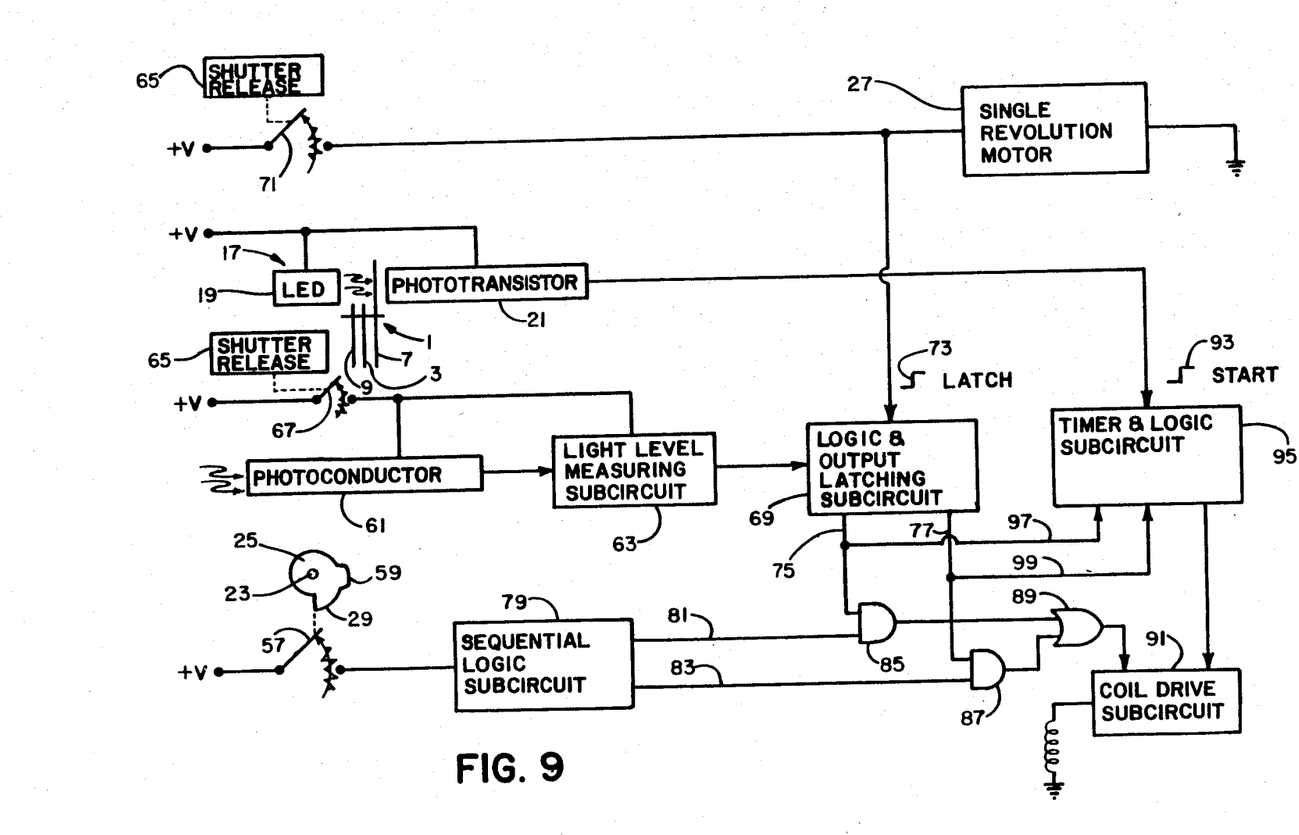
FIG. 9 is a schematic diagram of an electronic circuit suitable for use with the exposure control mechanism of FIGS. 1–8.

A light-responsive circuit, schematically depicted in FIG. 9, is provided for energizing the electromagnet 47 alternatively at the dim light related time, before the cocking-releasing cam 25 releases the aperture and opening blades 3 and 7 from their idle and covering positions, or at the bright light related time, after the cam releases the aperture blade, but before the cam releases the opening blade, and for de-energizing the electromagnet at a subsequent time, after the cam releases the opening blade and the opening blade uncovers the exposure aperture 15 for the appropriate pre-set duration related to the light intensity. Details of the circuit are explained below in connection with a description of the operation of the preferred embodiment. The circuit includes the optical switch 17 for shutter timing, as well as a biased-open mechanical switch 57 which is disposed in the rotational path of the cam 25 for closure by a lobe 59 on the cam before the cam releases the aperture blade 3. As is explained below, closure of the mechanical switch 57, together with an indication of the light intensity provided by a conventional arrangement of a photoconductor 61 exposed to ambient light and a light level measuring subcircuit 63, enables the electromagnet 47 to be energized alternatively at the dim light related time or at the bright light related time. Re-opening of the mechanical switch 57 as the lobe 59 moves clear of such switch, in conjunction with the indication of light intensity and closure of the optical switch 17 in response to the opening blade 7 pivoting from between the LED 19 and the phototransistor 21 to its uncovering position, enables the electromagnet 47 to be de-energized after the opening blade uncovers the exposure aperture 15 for the appropriate pre-set duration related to the light intensity.

Operation

The preferred embodiment operates as follows. When, as shown in FIG. 9, a shutter release 65 is manually depressed part way, a biased-open switch 67 is thereby closed, permitting cooperation of the photoconductor 61 and the light level measuring subcircuit 63 to enable such subcircuit to provide an electrical signal indicative of the ambient light intensity to a logic and output latching subcircuit 69. The logic and output latching subcircuit 69 is a known type having a combination of standard logic gates, comparators, and flip-flops, and compares the electrical signal from the light level measuring subcircuit 63 with internal references to determine whether the ambient light intensity is relatively bright or relatively dim. Continued depression of the shutter release 65 to its full extent closes a biased-open switch 71, thereby providing a latch command 73 to the logic and output latching subcircuit 69. The latch command 73 causes the subcircuit 69 to latch its outputs, which take the form of a higher voltage at a lead 75 and a lower voltage at a lead 77 during high ambient light and vice versa during dim ambient light. Using the binary number system, the higher voltage is commonly represented by the number 1 and the lower voltage is commonly represented by 0. In this instance, 1 and 0 are used as logic symbols, not numbers.

When the switch 71 is closed by full depression of the shutter release 65, the motor 27 is energized to rotate the cocking-releasing cam 25 one complete revolution in a counterclockwise direction about the stud 23. Beginning with FIG. 6, the cam 25 pivots the opening, aperture, and closing blades 7, 3, and 9 in a clockwise direction about the stud 11 from their respective uncovering, stopping down, and re-covering positions to their respective covering, idle, and non-covering positions, shown in FIG. 2. Then, the cam 25 closes the switch 57 and an electrical signal indicating such closure is provided to a sequential logic subcircuit 79. The sequential logic subcircuit 79 is a known type having a combination of standard logic gates and flip-flops, and initially provides respective outputs at two leads 81 and 83 in the form of lower voltages (0). However, in response to the electrical signal indicating closure of the switch 57, the subcircuit 79 changes its output from a lower voltage (0) to a higher voltage (1) at the lead 83. The output (0) at the lead 81 remains unchanged, and is not changed to the same output (1) as at the lead 83 until the switch 57 is re-opened.

As shown in FIG. 9, an AND gate 85 is connected to the logic and output latching subcircuit 69 and the sequential logic subcircuit 79 via respective leads 75 and 81, and an AND gate 87 is connected to the logic and output latching subcircuit and the sequential logic subcircuit via respective leads 77 and 83. The two AND gates 85 and 87 are separately connected to an OR gate 89 which, in turn, is connected to a known type of coil drive subcircuit 91 for the electromagnet 47. When the switch 57 is closed by the cam 25 during dim ambient light, the respective inputs to the AND gate 85 at the leads 75 and 81 are both 0, and the respective inputs to the AND gate 87 at the leads 77 and 83 are both 1. Consequently, during dim light the respective outputs of the AND gates 85 and 87 to the OR gate 89 are 0 and 1, with the result that the output of the OR gate to the coil drive subcircuit 91 is 1, thereby causing such subcircuit to energize the electromagnet 47 before the cam 25 can release the aperture and opening blades 3 and 7 from their idle and covering positions, as shown in FIG. 7. When the switch 57 is closed by the cam 25 during bright ambient light, the respective inputs to the AND gate 85 at the leads 75 and 81 are 1 and 0, and the respective inputs to the AND gate 87 at the leads 77 and 83 are 0 and 1. Consequently, during bright light the respective outputs of the AND gates 85 and 87 to the OR gate 89 are both 0, with the result that the output of the OR gate to the coil drive subcircuit 91 is 0, and the electromagnet 47 is not yet energized. Thus, during dim ambient light closure of the switch 57 will cause the armature 49 to retain the aperture and closing blades 3 and 9 in their idle and non-covering positions, as shown in FIG. 7, and during bright ambient light closure of such switch will not prevent the cam 25 from releasing the aperture blade to pivot to its stopping down position, as shown in FIG. 3.

When the switch 57 is re-opened during dim ambient light as the cam 25 rotates clear of such switch, the respective inputs to the AND gate 85 at the leads 75 and 81 are 0 and 1, and the respective inputs to the AND gate 87 at the leads 77 and 83 are both 1. Consequently, during dim light the respective outputs of the AND gates 85 and 87 to the OR gate 89 are unchanged, i.e., 0 and 1, and the electromagnet 47 remains energized. When the switch 57 is re-opened during bright ambient light as the cam rotates clear of such switch, the respective inputs to the AND gate 85 at the leads 75 and 81 are both 1, and the respective inputs to the AND gate 87 at the leads 77 and 83 are 0 and 1. Consequently, during bright light the output of the AND gate 85 to the OR gate 89 is changed from 0 to 1 and the output of the AND gate 87 to the OR gate remains the same, i.e., 0, with the result that the output of the OR gate to the coil drive subcircuit 91 changes from 0 to 1, thereby causing such subcircuit to energize the electromagnet 47 before the cam 25 can release the opening blade 7 from its covering position, as shown in FIG. 4. Thus, during dim ambient light re-opening of the switch 57 will not de-energize the electromagnet 47, and during bright ambient light re-opening of the switch will cause the armature 49 to retain the closing blade 9 in its non-covering position.

Continued rotation of the cam 25, with the electromagnet 47 energized during dim ambient light to retain the aperture and closing blades 3 and 9 in their idle and non-covering positions, as shown in FIG. 7, or energized during bright ambient light to retain only the closing blade, as shown in FIG. 4, releases the opening blade 7. The opening blade 7 pivots from its covering position between the LED 19 and the phototransistor 21 of the optical switch 17 to its uncovering position, permitting such switch to close and beginning the exposure interval. Closure of the optical switch 17 starts shutter timing by providing a start command 93 to a timer and logic subcircuit 95. The timer and logic subcircuit 95 is a known type having standard logic gates, and is connected by respective leads 97 and 99 to the two leads 75 and 77 from the logic and output latching subcircuit 69 to receive the latched outputs from the latter subcircuit, which indicate relatively dim or relatively bright ambient light. The start command 93 to the timer and logic subcircuit 95 causes a timer, not shown, in such subcircuit to begin a count-down for a pre-set short duration, e.g., 1/200 sec., should the latched outputs from the logic and output latching subcircuit 69 indicate bright ambient light. Alternatively, the timer begins a count-down for a pre-set long duration, e.g., 1/80 sec., should the latched output indicate dim ambient light. After the count-down for the selected pre-set duration is completed, the timer and logic subcircuit 95 provides a 0 output to the coil drive subcircuit 91, thereby causing the coil drive subcircuit to de-energize the electromagnet 47 and permit the armature 49 to release the closing blade 9, as shown in FIG. 6. The closing blade 9 then pivots from its non-covering position to its covering position, ending the exposure interval.

When the exposure interval is ended, the motor 27 continues to rotate the cam 25 until the cam has rotated one complete revolution. Then, the motor 27 is de-energized by suitable means, not shown, such as a timer or a switch, to conclude the sequence of operation.

While the invention has been described with reference to a preferred embodiment, it will be understood that various modifications may be effected within the ordinary skill in the art without departing from the scope of the invention. For example, instead of the single hole aperture blade 3, an aperture blade having various size holes locatable over the exposure aperture 15 may be used to provide a plurality of aperture sizes, e.g., f/16, f/8, and f/4.5, corresponding to various intensities of ambient light, such as bright, intermediate, and dim.

I claim:

1. In a camera of the type provided with (a) a diaphragm for reducing the effective size of an exposure aperture, (b) a shutter including an opening blade for uncovering the exposure aperture and a closing blade for re-covering the exposure aperture, and (c) means for urging said diaphragm to reduce the effective size of the exposure aperture and for urging said opening and closing blades to uncover and re-cover the exposure aperture, the improvement comprising:

electromechanical means, including a single electromagnet, activatable alternatively (i) at one time before said diaphragm reduces the effective size of the exposure aperture, for retaining said diaphragm and said closing blade to prevent said diaphragm from reducing the effective size of the exposure aperture and to prevent said closing blade from re-covering the exposure aperture, or (ii) at another time after said diaphragm reduces the effective size of the exposure aperture, for retaining only said closing blade, and de-activatable to release said diaphragm and said closing blade or merely said closing blade; and ambient light-regulated circuit means for activating said electromechanical means before said opening blade uncovers the exposure aperture (i) at said one time during relatively dim ambient light or (ii) at said other time during relatively bright ambient light, and for de-activating said electromechanical means after said opening blade uncovers the exposure aperture for a duration related to the intensity of ambient light.

2. In a camera of the type provided with (a) a diaphragm for reducing the effective size of an exposure aperture, (b) a shutter including an opening blade for uncovering the exposure aperture and a closing blade for re-covering the exposure aperture, and (c) means for urging said diaphragm to reduce the effective size of the exposure aperture and for urging said opening and closing blades to uncover and re-cover the exposure aperture, the improvement comprising:

armature means movable in one direction for retaining said diaphragm and said closing blade to prevent said diaphragm from reducing the effective size of the exposure aperture and to prevent said closing blade from re-covering the exposure aperture and movable in another direction to release said diaphragm and said closing blade;

a single electromagnet operatively associated with said armature means and energizable alternatively (i) at one time before said diaphragm reduces the effective size of the exposure aperture, for moving said armature means in said one direction to retain said diaphragm and said closing blade, or (ii) at another time after said diaphragm reduces the effective size of the exposure aperture, for moving said armature means in said one direction to retain only said closing blade, and de-energizable to permit movement of said armature means in said other direction to release said diaphragm and said closing blade or merely said closing blade;

ambient light-regulated circuit means for energizing said electromagnet before said opening blade uncovers the exposure aperture (i) at said one time during relatively dim ambient light or (ii) at said other time during relatively bright ambient light, and for de-energizing said electromagnet after said opening blade uncovers the exposure aperture for a duration related to the intensity of ambient light; and means for urging said armature means to move in said other direction.

3. The improvement as recited in claim 2, wherein said diaphragm includes an aperture blade having at least one opening locatable in coincidence with the exposure aperture to reduce the effective size of the exposure aperture, and said aperture and closing blades are supported for joint and separate movement about a common axis from respective overlapping positions removed from the exposure aperture to respective overlapping positions adjacent the exposure aperture.

4. The improvement as recited in claim 3, wherein said aperture and closing blades include respective engagable means aligned whenever said aperture and said closing blades are in their respective overlapping positions removed from the exposure aperture, and said armature means includes an engaging member for engaging said respective engagable means in alignment.

5. In a camera of the type provided with (a) an aperture blade movable between a stopping down position reducing the effective size of an exposure aperture and an idle position removed from the exposure aperture, (b) a shutter including an opening blade movable between a covering position blocking the exposure aperture and an uncovering position removed from the exposure aperture and a closing blade movable between a non-covering position removed from the exposure aperture and a recovering position blocking the exposure aperture, and (c) means for urging said aperture, opening, and closing blades to their respective stopping down, uncovering, and re-covering positions, the improvement comprising:

uni-directionally rotated, cocking-releasing cam means for first returning said aperture, opening, and closing blades to their respective idle, covering, and non-covering positions and then successively releasing said aperture and opening blades;

armature means movable in one direction for retaining said aperture and closing blades in their respective idle and non-covering positions and movable in another direction to release said aperture and closing blades;

a single electromagnet operatively associated with said armature means and energizable alternatively (i) at one time before said cam means releases said aperture and closing blades, for moving said armature means in said one direction to retain said aperture and closing blades or (ii) at another time after said cam means releases said aperture blade, but before said cam means releases said opening blade, for moving said armature means in said one direction to retain only said closing blade, and de-energizable to permit movement of said armature means in said other direction to release said aperture and closing blades or merely said closing blade;

ambient light-regulated circuit means for energizing said electromagnet (i) at said one time during relatively dim ambient light or (ii) at said other time during relatively bright ambient light, and for de-energizing said electromagnet after said cam means releases said opening blade; and means for urging said armature means to move in said other direction.

6. The improvement as recited in claim 5, wherein said circuit means includes a normally open switch disposed in the rotational path of said cam means for closure by said cam means before said cam means releases said aperture blade and for reopening after said cam means releases said aperture blade, but before said cam means releases said opening blade, to provide respective inputs for energizing said electromagnet at said one time or at said other time.

7. The improvment as recited in claim 5, wherein said aperture, opening, and closing blades are supported for pivotal movement about a common axis between their respective positions and said aperture and closing blades are supported in overlapping relation in their idle and non-covering positions.

8. The improvment as recited in claim 7, wherein said aperture and closing blades include respective engagable means aligned whenever said aperture blade is in its idle position and said closing blade is in its non-covering position, and said armature means includes an engaging member for engaging said respective engagable means in alignment.

* * * * *